US009013506B2

(12) United States Patent
Tamatani et al.

(10) Patent No.: US 9,013,506 B2
(45) Date of Patent: Apr. 21, 2015

(54) IMAGE PROCESSING APPARATUS, IMAGE PROCESSING METHOD, AND COMPUTER READABLE MEDIUM WITH PARALLEL RENDERING

(75) Inventors: Mitsuyuki Tamatani, Kanagawa (JP); Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/304,001

(22) Filed: Nov. 23, 2011

(65) Prior Publication Data

US 2012/0268486 A1 Oct. 25, 2012

(30) Foreign Application Priority Data

Apr. 25, 2011 (JP) .................................. 2011-096954

(51) Int. Cl.
  *G09G 5/00* (2006.01)
  *G06T 11/60* (2006.01)
  *G06F 3/12* (2006.01)

(52) U.S. Cl.
  CPC ............... *G06T 11/60* (2013.01); *G06F 3/1211* (2013.01); *G06F 3/124* (2013.01); *G06F 3/1247* (2013.01)

(58) Field of Classification Search
  CPC ....................................................... G06T 11/60
  USPC .................................................. 345/505, 629
  See application file for complete search history.

(56) References Cited

U.S. PATENT DOCUMENTS

| 2005/0188303 A1* | 8/2005 | Ayers et al. .................... 715/517 |
| 2007/0121160 A1* | 5/2007 | Markovic ...................... 358/1.16 |
| 2007/0195353 A1 | 8/2007 | Tsunoda |
| 2008/0288860 A1* | 11/2008 | Daviss .......................... 715/243 |
| 2009/0147288 A1* | 6/2009 | Matsuda ........................ 358/1.9 |
| 2010/0245917 A1* | 9/2010 | Nguyen et al. ............... 358/1.17 |
| 2010/0245918 A1* | 9/2010 | Nguyen et al. ............... 358/1.17 |

FOREIGN PATENT DOCUMENTS

| JP | H10-333852 A | 12/1998 |
| JP | A-2007-221604 | 8/2007 |

OTHER PUBLICATIONS

Nov. 4, 2014 Office Action issued in Japanese Patent Application No. 2011-096954.

* cited by examiner

*Primary Examiner* — Mark Zimmerman
*Assistant Examiner* — Vu Nguyen
(74) *Attorney, Agent, or Firm* — Oliff PLC

(57) ABSTRACT

An information processing apparatus includes a rendering processor that renders a plurality of objects on a page in a parallel process, an overlap determiner that determines a plurality of objects overlapping each other in accordance with coordinate information of each object on the page and acquires coordinate information of an overlap area between the objects, a timing controller that controls a timing of the rendering of each object in the parallel process of the rendering processor in accordance with the coordinate information of the overlap area, and a renderer that renders a lower-layer object in the overlap area in accordance with timing information generated by the timing controller prior to rendering an upper-layer object on the lower-layer object in a superimpose fashion.

6 Claims, 14 Drawing Sheets

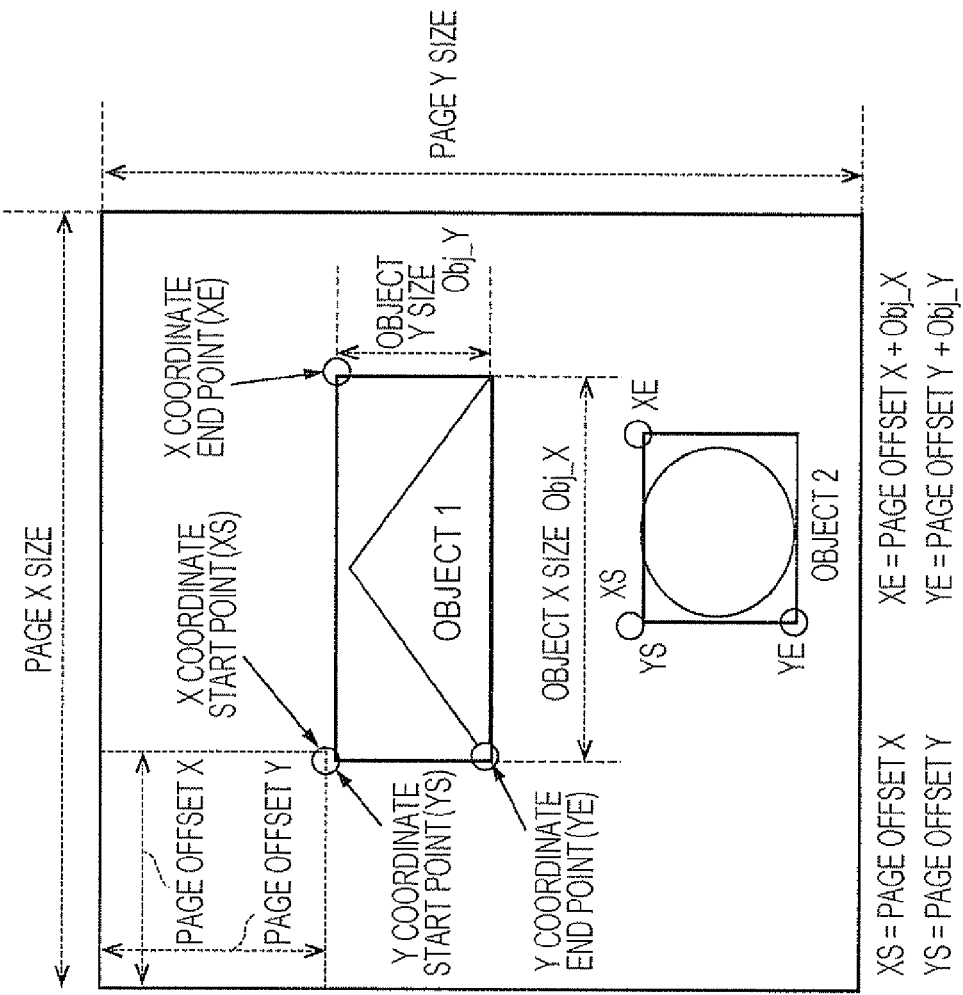
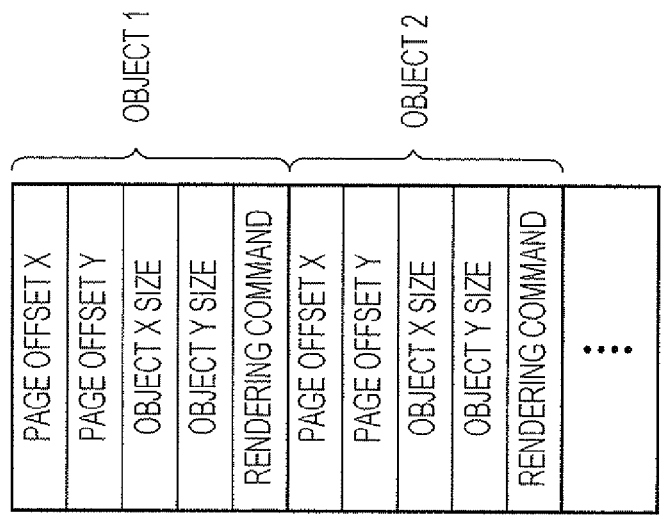

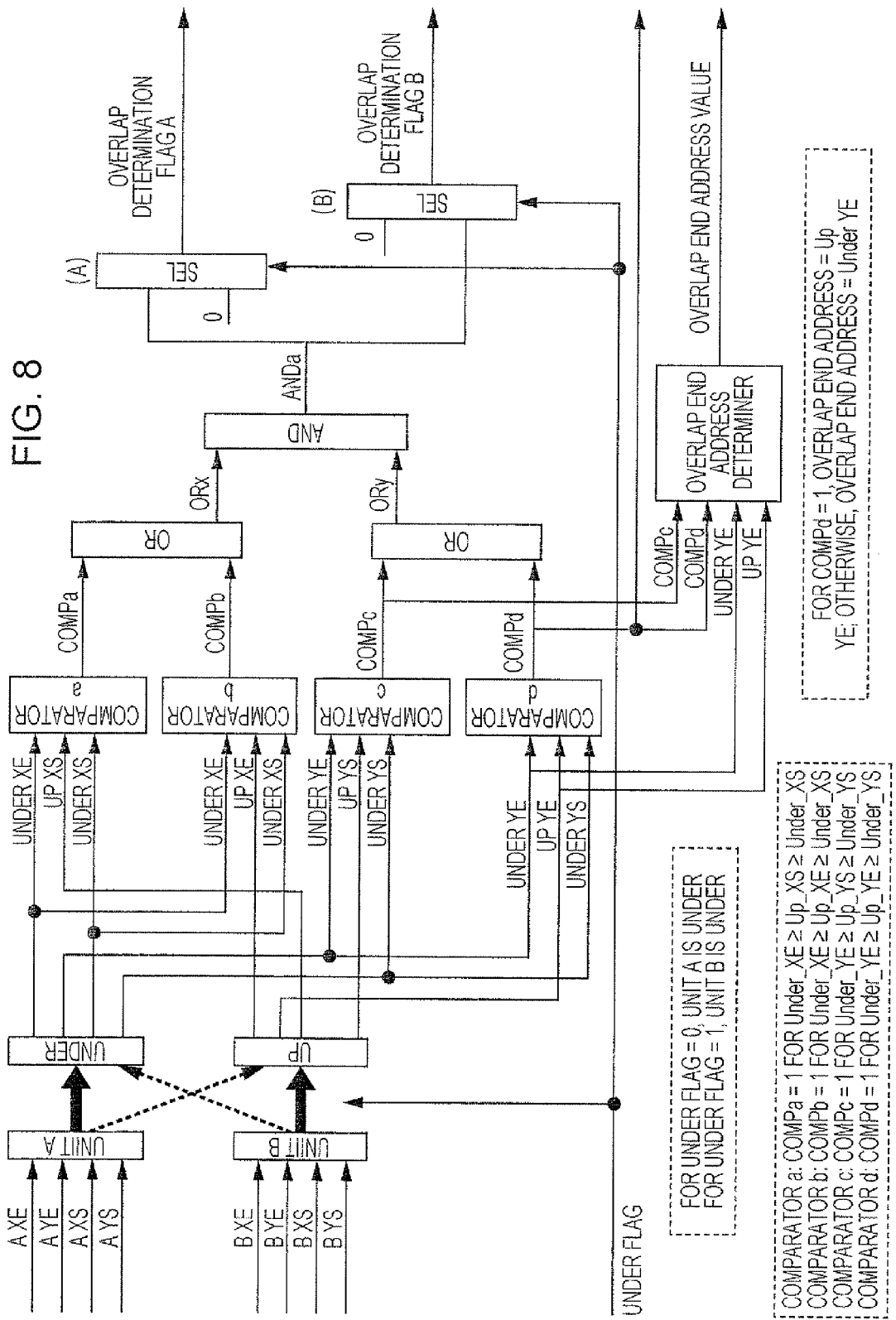

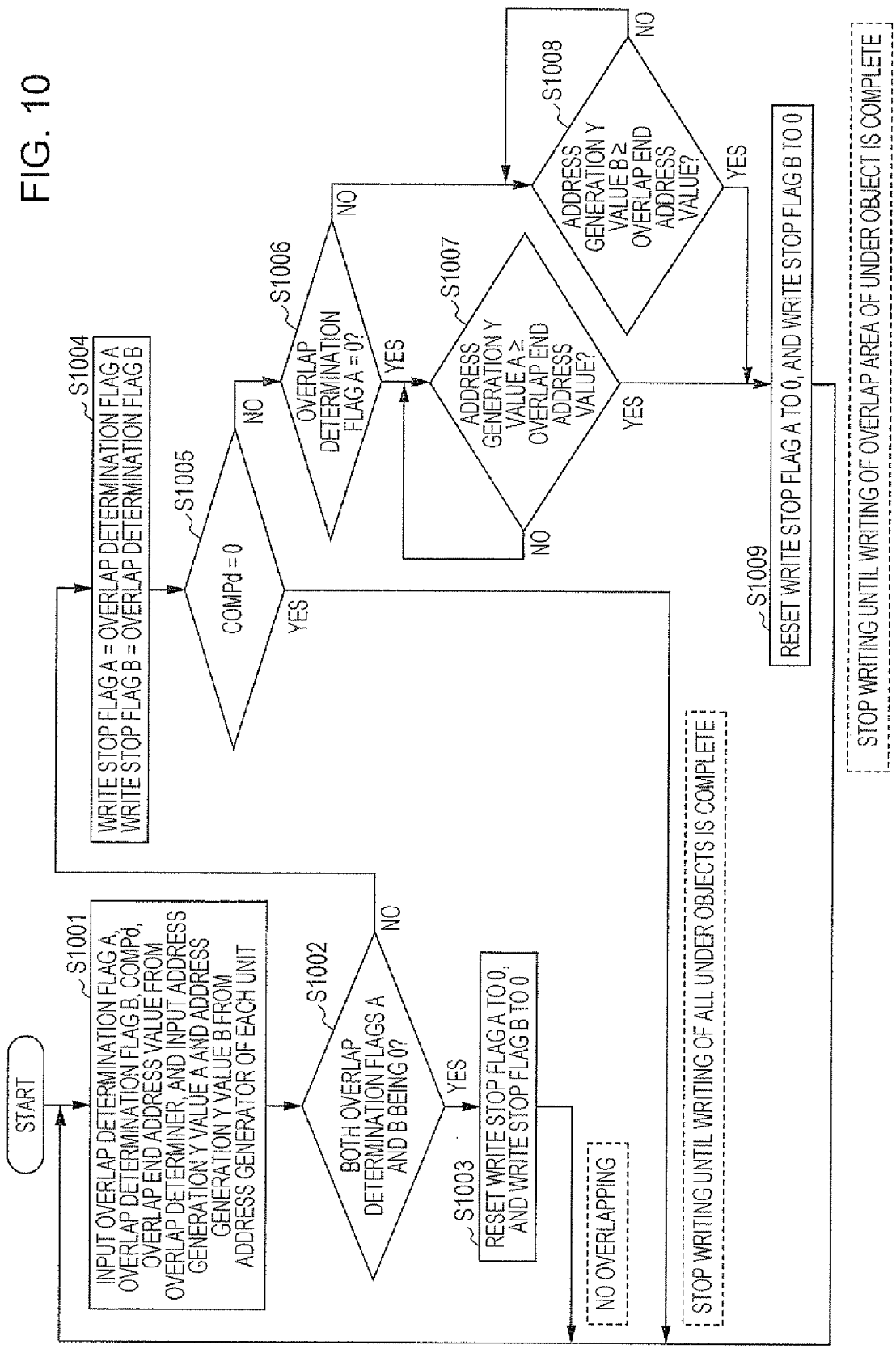

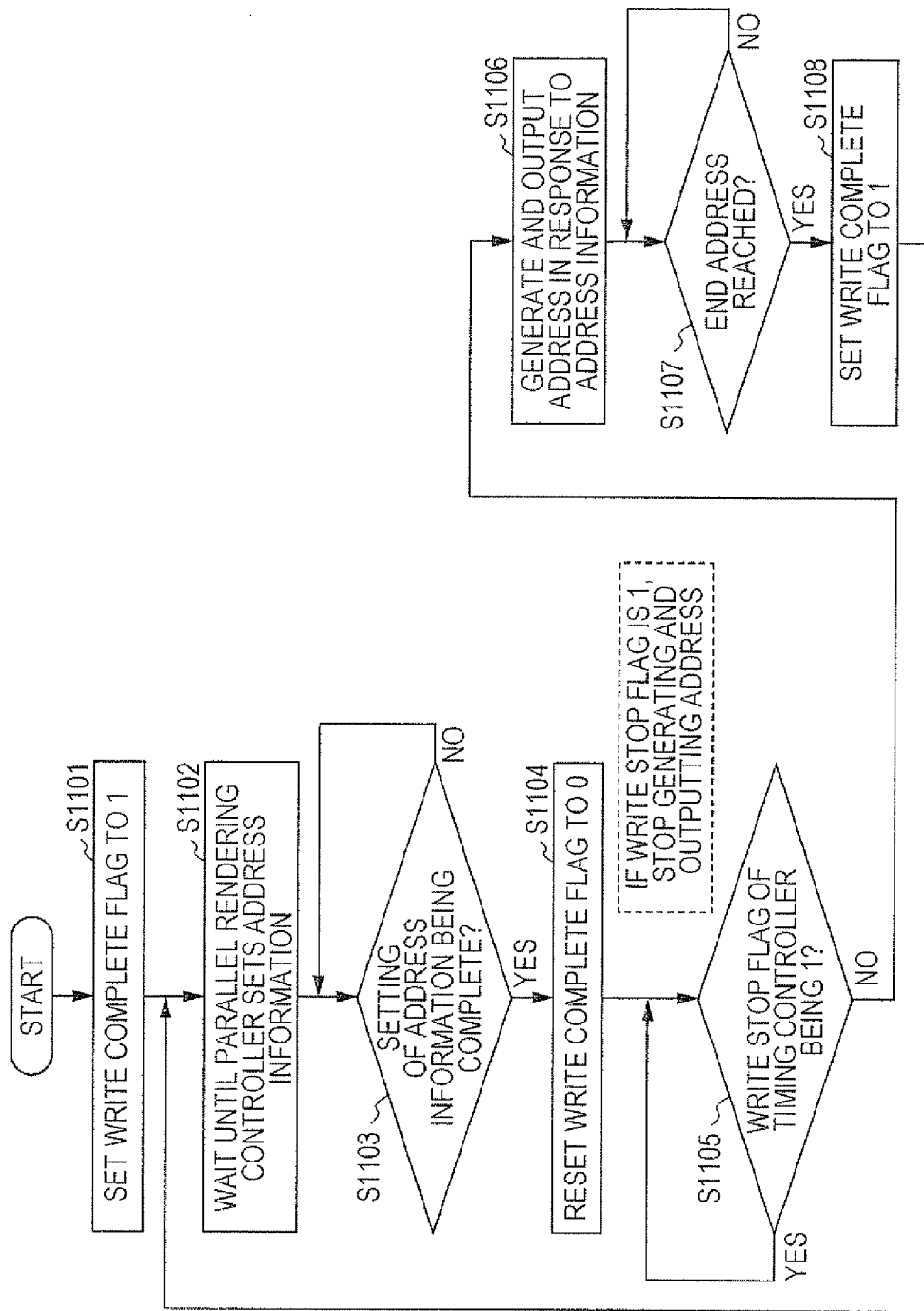

IMAGE PROCESSING APPARATUS, IMAGE PROCESSING METHOD, AND COMPUTER READABLE MEDIUM WITH PARALLEL RENDERING

CROSS-REFERENCE TO RELATED APPLICATIONS

This application is based on and claims priority under 35 USC 119 from Japanese Patent Application No. 2011-096954 filed Apr. 25, 2011.

BACKGROUND (i) Technical Field

The present invention relates to an image processing apparatus, an image processing method and a computer readable medium storing a program causing a computer to execute a process for rendering an image.

(ii) Related Art

Print data described in page description language (PDL) includes, on a page data unit of one page, multiple object data corresponding to a variety of objects such as an image, drawings, and characters. The print data further includes frame structure data that represent location data within a page of the objects. The print data is then transferred to an image processing apparatus such as a printer having a printing function. The image processing apparatus locates the multiple object data at an appropriate position within the page in accordance with the frame structure data. Image data for printing including multiple objects is thus generated.

Some of the objects included in the page may overlap each other. When the image data including the multiple objects is generated, the order of overlap of the mutually overlapping multiple objects is considered.

SUMMARY

According to an aspect of the invention, there is provided an information processing apparatus. The information processing apparatus includes a rendering processor that renders a plurality of objects on a page in a parallel process, an overlap determiner that determines a plurality of objects overlapping each other in accordance with coordinate information of each object on the page and acquires coordinate information of an overlap area between the objects, a timing controller that controls a timing of the rendering of each object in the parallel process of the rendering processor in accordance with the coordinate information of the overlap area, and a renderer that renders a lower-layer object in the overlap area in accordance with timing information generated by the timing controller prior to rendering an upper-layer object on the lower-layer object in a superimpose fashion.

BRIEF DESCRIPTION OF THE DRAWINGS

Exemplary embodiments of the present invention will be described in detail based on the following figures, wherein:

FIGS. 3A and 3B illustrate intermediate language data and an image corresponding there to;

FIG. 8 illustrates a structure and process of an overlap determiner;

FIG. 10 is a flowchart of a process of a timing controller;

FIG. 11 is a flowchart of a process of address generators;

DETAILED DESCRIPTION

Exemplary embodiments of the present invention are described below.

Figure 1:
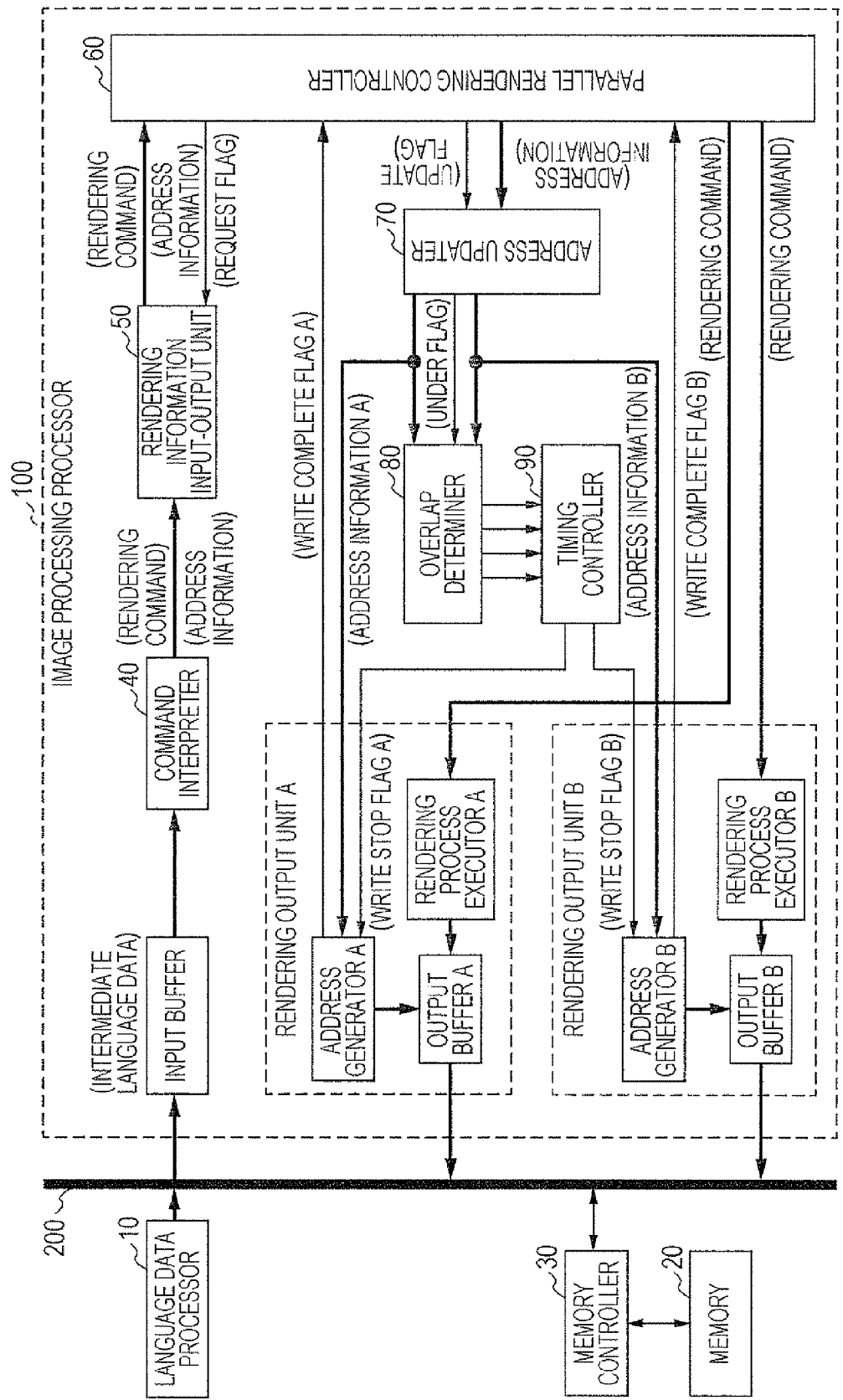
FIG. 1 illustrates an image processing apparatus of an exemplary embodiment of the present invention.

FIG. 1 illustrates an image processing apparatus as an exemplary embodiment of the present invention. The image processing apparatus of FIG. 1 processes data related to an image including multiple objects on a per page basis, and then generates the image of the page. The multiple objects are rendered at a position specified on each page through a parallel process. Some of the multiple objects may overlap each other. In the rendering of the parallel process, a control process is performed with the overlapping of the objects taken into account.

Figure 2A:
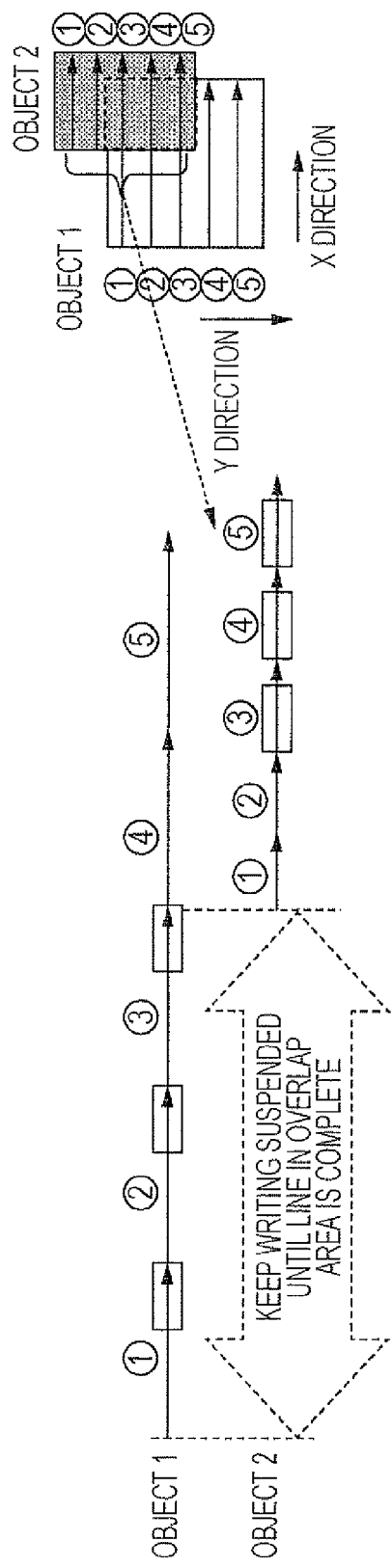
FIGS. 2A and 2B illustrate a specific example of overlapping of objects in accordance with the exemplary embodiment.
Figure 2B:
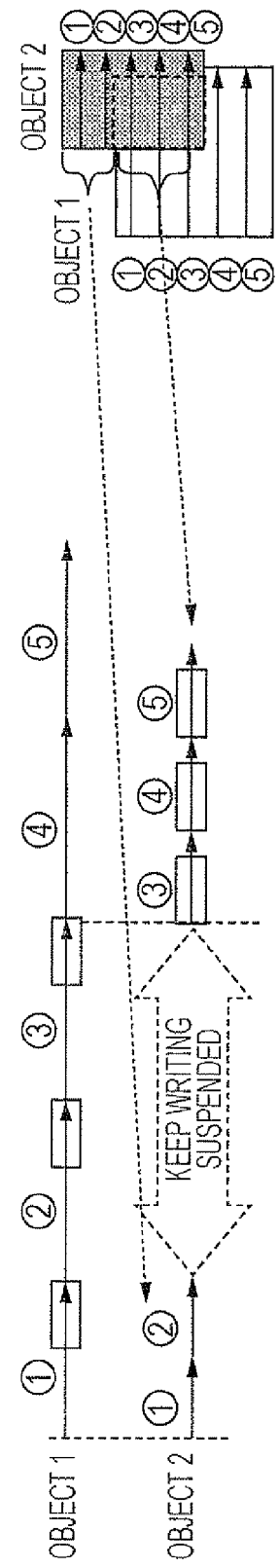

FIGS. 2A and 2B illustrate a specific example of the object overlapping of the exemplary embodiment. As illustrated in FIGS. 2A and 2B, image data of mutually overlapping object 1 and object 2 are written on a memory storing the image data corresponding to each page. The image data of each object is processed on a per line basis of lines extending in an X direction. Multiple lines arranged line by line in a Y direction are written on the memory in the order of small line number to large line number (starting with a line closer to the origin in the Y direction).

In an example of FIG. 2A, the writing (rendering) of the object 2 at an upper layer is kept suspended until the writing (rendering) of the object 1 at a lower layer is complete in an area where the object 1 and the object 2 overlap. The writing of the object 2 starts after the writing of the object 1 is complete in the overlap area.

In an example of FIG. 2B, the writing (rendering) of the object 1 and the object 2 starts. When the writing of the upper-layer object 2 reaches the overlap area, the writing of the upper-layer object 2 is caused to suspend. The writing of the object 2 resumes when the writing of the object 1 is complete in the overlap area.

In each of the examples of FIGS. 2A and 2B, the writing of the upper-layer object 2 starts after the writing of the lower-layer object 1 is complete. The two objects are thus overlapped in the appropriate order in the entire overlap area, and the image data of the page is thus generated.

With reference back to FIG. 1, the data of the image to be processed in the exemplary embodiment may be supplied by an external apparatus such as a computer, or may be acquired from a medium such as paper via an image reader (not illustrated) having a scan function. The processed image may be printed on paper using a printer (not illustrated) having a print function or the data of the processed image may be supplied to the external apparatus.

The image processing apparatus of FIG. 1 includes image processing processor 100, language data processor 10, memory controller 30, and memory 20 controlled by the memory controller 30. The language data processor 10, and the memory controller 30 are connected to the image processing processor 100 via a data bus 200. Part of the structure of FIG. 1 may be arranged external to the image processing apparatus.

The language data processor 10 converts the data of the image to be processed by the image processing apparatus into data having a format compatible with a process of a subsequent stage of the image processing apparatus. The language data processor 10 may include a central processing unit (CPU). With the CPU and a program running on the CPU operating in concert, the language data processor 10 converts page description language (PDL) data supplied by a computer or the like into intermediate language data compatible with the subsequent stage. Optionally, the intermediate language data may be generated from an image read via the image reader.

FIGS. 3A and 3B illustrate the intermediate language data and a specific image corresponding to the intermediate language data. The intermediate language data includes data related to multiple pages, and further includes data of multiple objects on each page. FIG. 3A illustrates specific intermediate language data on a page including an object 1 (ID=1) and an object 2 (ID=2).

Of multiple objects, the lower layer the object is arranged at, the smaller the object ID thereof is. For example, if the object 1 and the object 2 overlap each other as illustrated in FIGS. 3A and 3B, the object 1 is placed under the object 2. The multiple objects included on the page are described in the order of from small to large object ID in the intermediate language data. As illustrated in FIG. 3A, the object 1 is described followed by the object 2.

In the specific example of FIG. 3A, the object data include location information (page offset) of an object on the page, size information indicating the size of the object, and a rendering command indicating rendering content of the object (such as image, drawing, or character). Each object is rendered within the page in accordance with these data, and the image of FIG. 3B is thus generated.

With reference back to FIG. 1, the intermediate language data generated by the language data processor 10 is transferred to the image processing processor 100 via the data bus 200. The image processing processor 100 includes a dynamic reconfigurable processor (DRP), and performs a rendering process on multiple objects described in the intermediate language data and supplied by the language data processor 10. The image processing processor 100 may be implemented using a programmable logic device (PLD), a file programmable gate array (FPGA), or an application specific integrated circuit (ASIC). The image processing processor 100 may be constructed of a different hardware structure. The elements of the image processing processor 100 are described in detail below.

The intermediate language data generated in the language data processor 10 is transferred to a command interpreter 40 via an input buffer within the image processing processor 100. The command interpreter 40 analyzes the object data included in the intermediate language data, calculates address information and rendering information on a per object basis, and outputs these pieces of resulting information to a rendering information input-output unit 50 as a subsequent stage.

Figure 4:
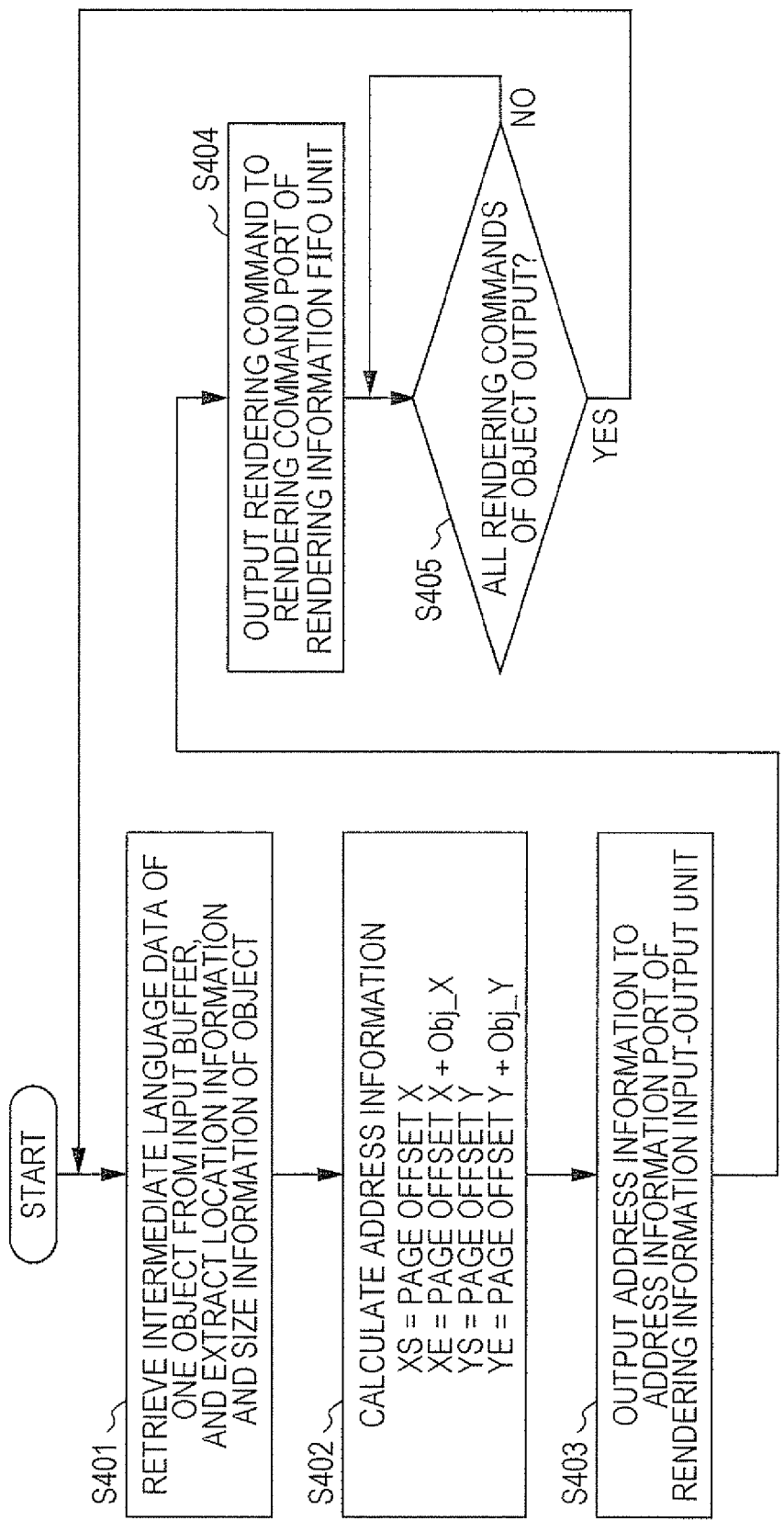
FIG. 4 is a flowchart of a process of a command interpreter.

FIG. 4 is a flowchart of a process of the command interpreter 40. The command interpreter 40 reads the intermediate language data of one object from the input buffer that temporarily stores the intermediate language data, and extracts the location information and the size information of the object (S401). In response to the location information and the size information, the command interpreter 40 calculates the address information in accordance with which the object is stored on a memory (on which an image corresponding to the page is formed) (S402). Calculated as the address information of the object are X coordinate start point XS, X coordinate end point XE, Y coordinate start point YS, and Y coordinate end point YE (see FIG. 3B).

The calculated address information is output to an address information port of the rendering information input-output unit 50 (see FIG. 1) (S403). A rendering command of each object extracted from the intermediate language data is output to a rendering command port of the rendering information input-output unit 50 (S404). Operations in S401 through S404 are repeated until the rendering commands of all objects included in the intermediate language data are output (S405).

Figure 5:
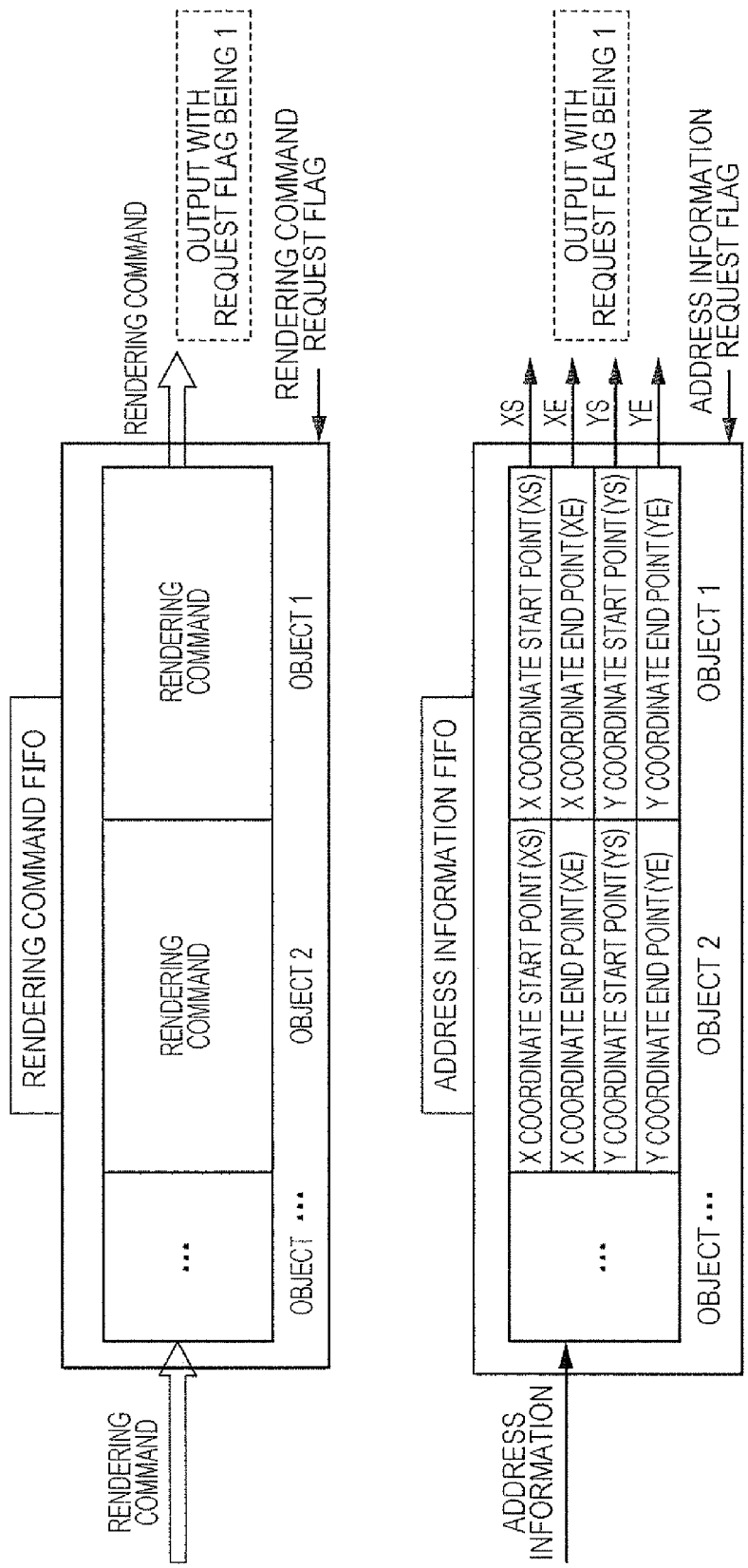
FIG. 5 illustrates a structure and process of a rendering information input-output unit.

FIG. 5 illustrates a structure and process of the rendering information input-output unit 50. The rendering information input-output unit 50 of FIG. 1 includes first-in first-out (FIFO) memories respectively corresponding to a rendering command and address information obtained from the command interpreter 40. In other words, the rendering information input-output unit 50 includes a rendering command FIFO and an address FIFO.

A rendering command output from the command interpreter 40 to the rendering command port of the rendering information input-output unit 50 is received at the rendering command FIFO. The rendering commands of the objects are successively input in the order of from small to large object ID. As illustrated in FIG. 5, the objects are input in the order of the object 1 (ID=1), the object 2 (ID=2), . . . .

The rendering commands thus input are output from the rendering command FIFO to a parallel rendering controller 60 (FIG. 1) in response to a request from the parallel rendering controller 60. If a rendering command request flag obtained from the parallel rendering controller 60 is 1, a rendering command of one object is output from the rendering command FIFO to the parallel rendering controller 60. The rendering commands of the objects are output in the order of small to large object ID. As illustrated in FIG. 5, the rendering commands of the objects are output in the order of the object 1, the object 2, . . . .

The rendering command FIFO performs an input operation and an output operation of the rendering command in a mutually asynchronous fashion.

The address information output from the command interpreter 40 to the address information port of the rendering information input-output unit 50 is input to the address information FIFO. The address information (XS, XE, YS, and YE) of the objects is input in the order of from small to large object ID. In other words, the address information is input in the order of the object 1 (ID=1), the object 2 (ID=2), . . . , as illustrated in FIG. 5.

The address information thus input is output from the address information FIFO to the parallel rendering controller 60 in response to a request from the parallel rendering controller 60. If an address information request flag obtained from the parallel rendering controller 60 is 1, the address information of one object is output from the address information FIFO to the parallel rendering controller 60. The address information of the objects is output in the order of from small to large object ID. More specifically, the address information is output in the order of the object 1, the object 2, . . . , as illustrated in FIG. 5.

The address information FIFO performs an input operation and an output operation of the address information in a mutually asynchronous fashion.

With reference back to FIG. 1, the parallel rendering controller 60 retrieves the address information and the rendering command of each object from the rendering information input-output unit 50. The parallel rendering controller 60 transfers the address information to the address updater 70 and the rendering command to one of a rendering output unit A and a rendering output unit B.

Figure 6:
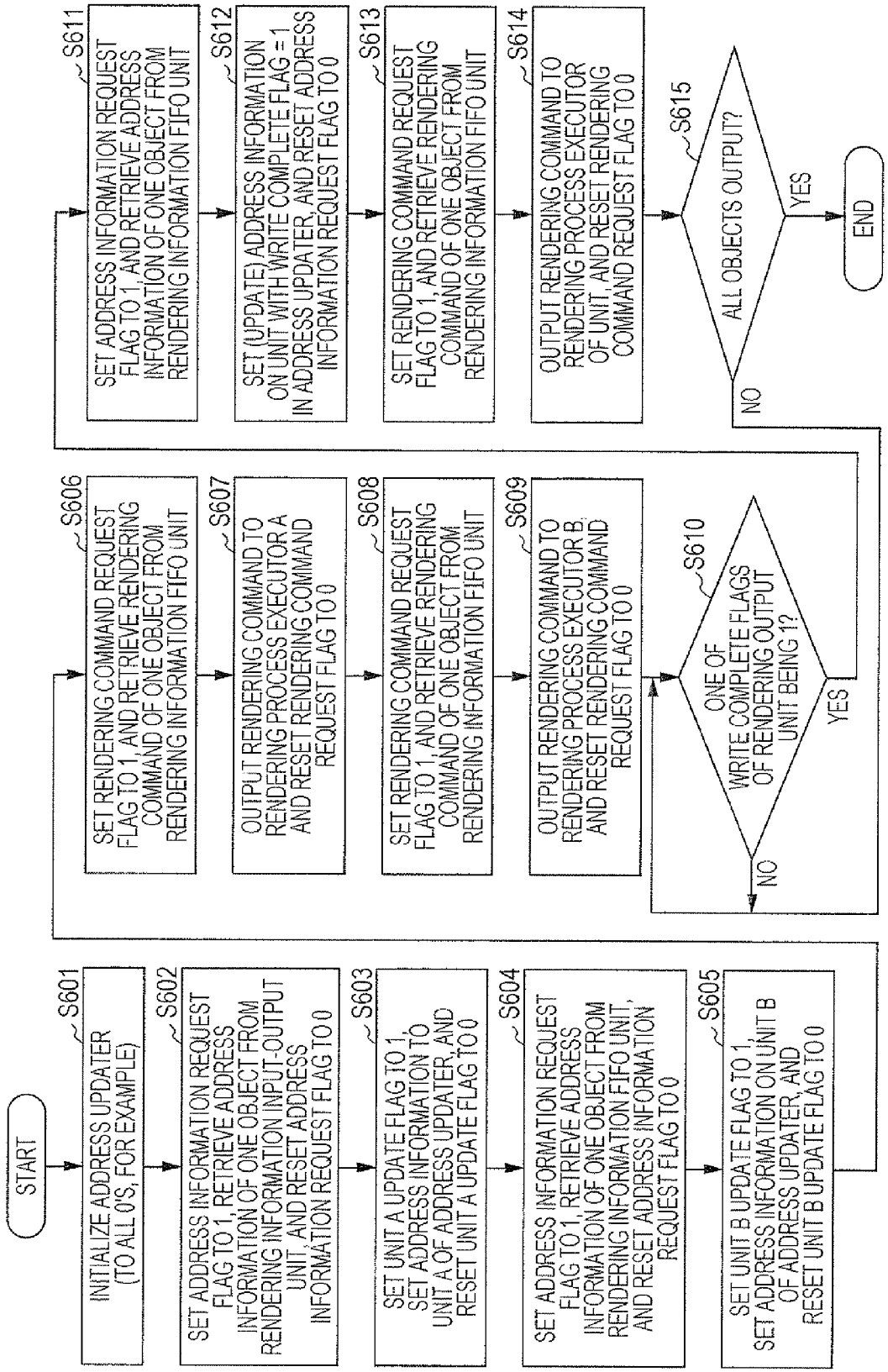
FIG. 6 is a flowchart of a process of a parallel rendering controller.

FIG. 6 is a flowchart of a process of the parallel rendering controller 60. The address updater 70 is initialized (S601). More specifically, data of registers (to be discussed later) in the address updater 70 are reset to 0's.

The parallel rendering controller 60 sets the address information request flag to 1, retrieves the address information of one object from the rendering information input-output unit 50, and resets the address information request flag to 0 after the retrieval of the address information (S602). The parallel rendering controller 60 sets a unit A update flag to 1, sets the address information retrieved in S602 on a register of the unit A of the address updater 70, and then resets the unit A flag to 0 (S603).

The parallel rendering controller 60 sets the address information request flag to 1, retrieves the address information of one object from the rendering information input-output unit 50, and then resets the address information request flag to 0 after the retrieval of the address information (S604). The parallel rendering controller 60 sets a unit B update flag to 1, sets the address information retrieved in step S604 on a register of a unit B of the address updater 70, and resets the unit B update flag to 0 (S605).

The parallel rendering controller 60 sets a rendering command request flag to 1, retrieves the rendering command of one object from the rendering information input-output unit 50 (S606), outputs the retrieved rendering command to a rendering process executor A of the rendering output unit A, and then resets the rendering command request flag to 0 (S607).

The parallel rendering controller 60 sets the rendering command request flag to 1, retrieves the rendering command of one object from the rendering information input-output unit 50 (S608), outputs the retrieved rendering command to the rendering process executor B of the rendering process executor B, and then resets the rendering command request flag to 0 (S609).

The parallel rendering controller 60 monitors continuously write complete flags output from the rendering output unit A and the rendering output unit B. If the write complete flag of one of the units turns to be 1 (S610), the parallel rendering controller 60 sets the address information request flag to 1, and retrieves the address information of one object from the rendering information input-output unit 50 (S611). The parallel rendering controller 60 then sets (updates) the retrieved address information to the register of the unit A or the unit B in the address updater 70 whichever has a write complete flag of 1, and then resets the address information request flag to 0 (S612).

The parallel rendering controller 60 sets the rendering command request flag to 1, retrieves the rendering command of one object from the rendering information input-output unit 50 (S613), outputs the retrieved rendering command to the rendering process executor of the unit having a write complete flag of 1, and resets the rendering command request flag to 0 subsequent to the outputting (S614).

Operations S610 through S614 performed on a per object basis are repeated until all the objects are processed (S615).

Figure 7:
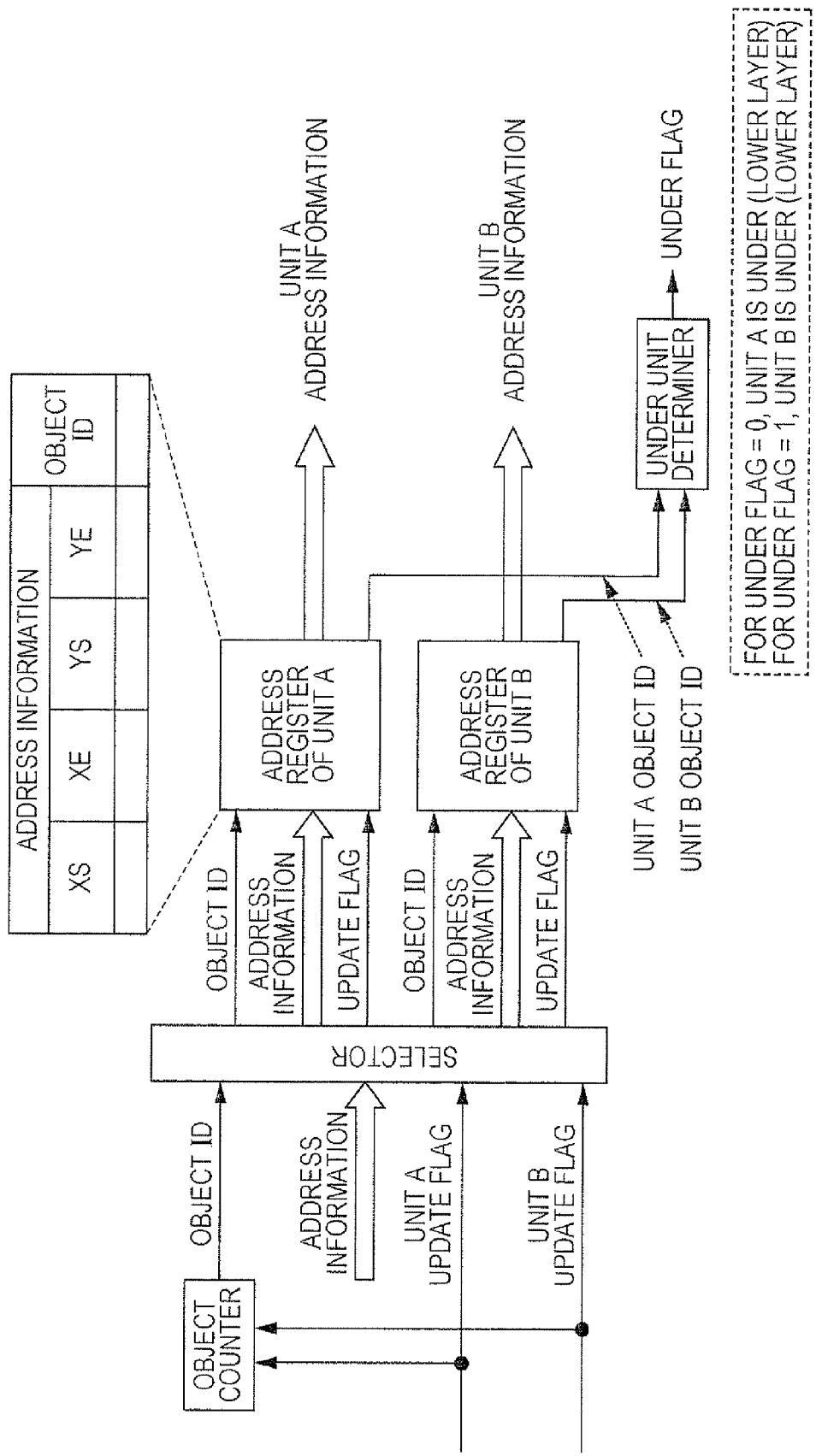
FIG. 7 illustrates a structure and process of an address updater.

FIG. 7 illustrates a structure and process of the address updater 70. The unit A update flag and the unit B update flag are output from the parallel rendering controller 60 (FIG. 1). The address updater 70 includes address registers for the two rendering output units, i.e., the address register of the unit A, and the address register of the unit B. The address updater 70 further includes a selector, an object counter, and an under unit determiner.

The object counter has a default value of 0, and counts up by 1 when one of the unit A update flag and the unit B update flag turns to be 1. One of the unit A update flag and the unit B update flag turns to be 1 each time the process of each object is performed starting with the object 1. The count at the object counter equals the object ID, and the object ID is then output to the selector.

If the unit A update flag is 1, the selector outputs the address information from the parallel rendering controller 60, the object ID of the address information, and the update flag to the address register of the unit A. If the unit B update flag is 1, the selector outputs the address information from the parallel rendering controller 60, the object ID of the address information, and the update flag to the address register of the unit B.

Set on each address register as illustrated in FIG. 7 are the address information of each object (the X coordinate start point XS, the X coordinate end point XE, the Y coordinate start point YS, and the Y coordinate end point YE in FIG. 3B), and the object ID of the object.

The under unit determiner compares the object IDs set in the two registers, and determines a smaller object ID as an underside object (at a lower layer). If the unit A is at a lower layer, an under flag is reset to 0. If the unit B is at a lower layer, the under flag is set to 1.

An overlap determiner 80 of FIG. 1 references the address information set in the address register of the unit A (unit A address information), the address information set in the address register of the unit B (unit B address information), and the under flag output from the under unit determiner.

With reference back to FIG. 1, the overlap determiner 80 determines multiple objects overlapping each other in accordance with coordinate information of each object on a page, and acquires coordinate information of an overlap area. Using the unit A address information and the unit B address information obtained from the address updater 70, the overlap determiner 80 determines whether the two objects processed by the rendering output unit A and the rendering output unit B overlap each other. If the two objects overlap each other, the overlap determiner 80 calculates an end address of the overlap area.

FIG. 8 illustrates a structure and process of the overlap determiner 80. In response to the under flag output from the address updater 70, the overlap determiner 80 determines which of the objects of the rendering output unit B and the rendering output unit B is at an underside. If the under flag is 0, the overlap determiner 80 determines that the object of the rendering output unit A is at an underside, and that the object of the rendering output unit B is at an upside.

If the under flag is 0, the unit A address information (AXE, AYE, AXS, AYS) obtained from the address updater 70 is supplied to an under circuit, and the unit A address information is under address information (UnderXE, UnderYE, UnderXS, and UnderYS). The unit B address information (BXE, BYE, BXS, BYS) obtained from the address updater

70 is supplied to an up circuit, and the unit B address information is up address information (UpXE, UpYE, UpXS, and UpYS).

If the under flag is 1, it is determined that the object of the rendering output unit B is at an underside, and that the object of the rendering output unit A is at an upside. It is also determined that the unit B address information is the under address information, and that the unit A address information is the up address information.

The under address information and up address information thus obtained are compared by comparator circuits a through d. The address information compared by the comparator circuits and comparison results are described below.

The comparator circuit a sets COMPa to be 1 if relationship UnderXE≥UpXS≥UnderXS holds, and sets COMPa to be 0 if otherwise. The comparator circuit b sets COMPb to be 1 if relationship UnderXE≥UpXE≥UnderXS holds, and sets COMPb to be 0 if otherwise. The comparator circuit c sets COMPc to be 1 if relationship UnderYE≥UpYS≥UnderYS holds, and sets COMPc to be 0 if otherwise. The comparator circuit d sets COMPd to be 1 if relationship UnderYE≥UpYE≥UnderYS holds, and sets COMPd to be 0 if otherwise.

COMPa and COMPb are OR gated through an OR gate circuit, and the results of OR gating are output as ORx. COMPc and COMPd are OR gated through an OR gate circuit, and the results of OR gating are output as ORy. ORx and ORy are AND gated through an AND gate circuit, and the results of AND gating are output as ANDa.

ANDa resulting from the comparison operations and the logic gating operations is ANDa=1 if the object of the rendering output unit A and the object of the rendering output unit B overlap each other, and is ANDa=0 if the object of the rendering output unit A and the object of the rendering output unit B do not overlap each other.

SEL circuit (A) selects one of the two inputs, ANDa and 0, in response to the value of the under flag, and outputs the selected input as an overlap determination flag A. More specifically, the overlap determination flag A=0 if the under flag=0, and the overlap determination flag A=ANDa if the under flag=1.

SEL circuit (B) selects one of the two inputs, 0 and ANDa, in response to the value of the under flag, and outputs the selected input as an overlap determination flag B. More specifically, the overlap determination flag B=ANDa if the under flag=0, and the overlap determination flag B=0 if the under flag=1.

An overlap end address determiner outputs an overlap end address value in response to COMPc output from the comparator circuit c, COMPd output from the comparator circuit d, UnderYE as the under address information, and UpYE as the up address information. The overlap end address determiner sets the overlap end address to be UpYE if COMPd=1, and sets the overlap end address to be UnderYE if otherwise.

FIGS. 9A through 9D illustrate specific cases of the overlap end address. Four overlap cases of the underside object 1 and the upside object 2 are illustrated in FIGS. 9A through 9D. In the overlap case illustrated in FIG. 9A, UpYE of the object 2 is external to the object 1. Relationship UnderYE≥UpYE≥UnderYS is not satisfied, and thus COMPd=0. The overlap end address is UnderYE. More specifically, UnderYE as the end line of the underside object 1 is the end line of the overlap area.

Figure 9A:
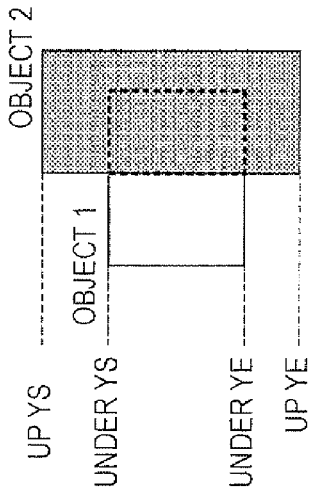
FIGS. 9A through 9D illustrate a specific example of an overlap end address.
Figure 9B:
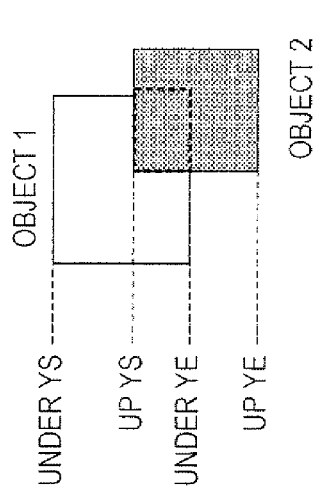

The same is true of the overlap case of FIG. 9B. Since UpYE of the object 2 is external to the object 1, the overlap end address is UnderYE. UnderYE as the end line of the underside object 1 is an end line of the overlap area.

Figure 9C:
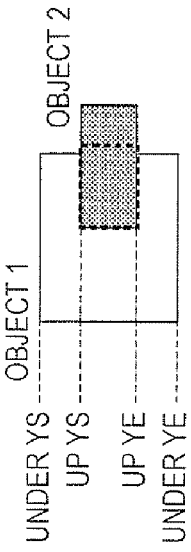

In the overlap case of FIG. 9C, UpYE of the object 2 is present within the object 1. The relationship UnderYE≥UpYE≥UnderYS is satisfied, leading to COMPd=1. The overlap end address is UpYE. UpYE as the end line of the upside object 2 is an end line of the overlap area.

Figure 9D:
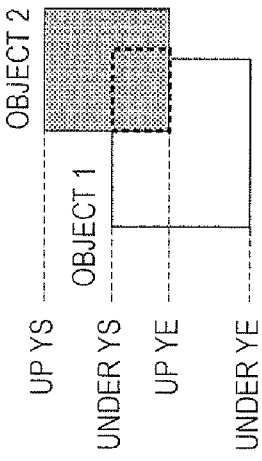

The same is true of the overlap case of FIG. 9D. UpYE of the object 2 is present within the object 1. The overlap end address is UpYE. UpYE as the end line of the upside object 2 is an end line of the overlap area.

With reference back to FIG. 1, the timing controller 90 controls the timing of the rendering of the object in the rendering process in accordance with the coordinate information obtained from the overlap determiner 80. The timing controller 90 thus causes the underside object in the overlap area to be rendered, and then causes the upside object to be rendered. More specifically, the timing controller 90 uses the overlap end address obtained from the overlap determiner 80 to control an address generator A of the rendering output unit A and an address generator B of the rendering output unit B.

FIG. 10 is a flowchart of the process of the timing controller 90. The timing controller 90 receives from the overlap determiner 80 (FIG. 1) the overlap determination flag A, the overlap determination flag B, COMPd, and the overlap end address value. The timing controller 90 also receives an address generation Y value A from the address generator A of the rendering output unit A, and an address generation value B from the address generator B of the rendering output unit B (S1001). The address generation Y value A is a value that is a Y coordinate value (line number) of an object rendered by the rendering output unit A (written on the memory), and the address generation Y value B is a Y coordinate value (line number) of an object rendered by the rendering output unit B (written on the memory).

The timing controller 90 determines the overlap determination flag A and the overlap determination flag B (S1002). If the overlap determination flag A and the overlap determination flag B are both 0, the object of the rendering output unit A and the object of the rendering output unit B do not overlap each other (ANDa=0 in FIG. 8). The write stop flag A is reset to 0, and the write stop flag B is also reset to 0 (S1003). The write stop flag A controls the address generator A of the rendering output unit A and the write stop flag B controls the address generator B of the rendering output unit B.

If the determination of the overlap determination flag A and the overlap determination flag B (S1002) reveals that one of the overlap determination flag A and the overlap determination flag B is not 0, the timing controller 90 sets the write stop flag A to be the overlap determination flag A and the write stop flag B to be the overlap determination flag B (S1004). In this way, the write stop flag of the upside object is set to be 1, and the write stop flag of the underside object is reset to 0.

The timing controller 90 determines COMPd (S1005). If COMPd=0, the timing controller 90 keeps the statuses of the write stop flag A and the write stop flag B set in S1004. Such an overlap case is illustrated in FIGS. 9A and 9B. The writing of the upside object is suspended until all the writing of the underside object (writing onto the memory) is complete.

If the determination in S1005 of FIG. 10 reveals that COMPd is not 0, processing proceeds to S1006 related to the overlap determination flag A. Such a specific overlap case is illustrated in FIGS. 9C and 9D.

If the determination in S1006 of FIG. 10 reveals that the overlap determination flag A=0, the object of the rendering output unit A is at an underside. The timing controller 90 compares the address generation Y value A of the rendering output unit A with the end address value (S1007). If the overlap determination flag A=0, the overlap determination flag B=1 (in the determination of S1002). The write stop flag B is set to 1 (in the setting of S1004), and the writing of the object by the rendering output unit B is suspended. The writing of the object by the rendering output unit A is in progress. When the address generation Y value A becomes equal to or above the end address value, the write stop flag B is reset to 0 (S1009). The rendering output unit B starts writing the upside object.

If it is determined in S1006 that the overlap determination flag A is not 0, the object of the rendering output unit B is at an underside. The timing controller 90 compares the address generation Y value B of the rendering output unit B with the overlap end address value (S1008). If the overlap determination flag A is not 0, i.e., if the overlap determination flag A is 1, the write stop flag A is set to 1 (in the setting in S1004), and the writing of the object by the rendering output unit A is suspended. The writing of the object by the rendering output unit B is in progress. When the address generation Y value B becomes equal to or above the end address value, the write stop flag A is reset to 0 (S1009). The rendering output unit A starts writing the upside object.

With reference back to FIG. 1, the rendering output unit B includes rendering process executor A, output buffer A, and address generator A. The rendering process executor A generates image data of the object in response to the rendering command (see FIG. 6) of the object obtained from the parallel rendering controller 60. The rendering process executor A develops the rendering command of the object obtained from the parallel rendering controller 60 into bitmap data.

The image data of the object generated by the rendering process executor A (such as the bitmap data) is output to the data bus 200 via the output buffer A. The memory controller 30 then stores the image data of the object obtained via the data bus 200 onto the memory 20.

The memory 20 serves as an area where the image data (such as the bitmap data) of each page including multiple objects is stored. Each piece of multiple pixel data forming the image data of each page is stored (rendered) at an address (of the memory 20) corresponding to coordinate values (X and Y coordinate values) in the page.

The address generator A generates an address where the object is to be stored (rendered) on the memory 20, in accordance with the address information of the object retrieved from the address register (see FIG. 7) of the unit A in the address updater 70. In other words, the address generator A generates the address of the image data of the object to be generated in the rendering process executor A.

The image data of each object is processed in the X direction on a per line basis, and multiple lines arranged in the Y direction are written in the order from small to large line number on the memory 20 (see FIGS. 2A and 2B). As to multiple lines forming the image data of each object, the address generator A generates addresses of from a start line to an end line (Y coordinates of from the start line to the end line), and addresses of from a start pixel to an end pixel on each line (X coordinates of from the start pixel to the end pixel).

The address generator A controls the timing of outputting the address in response to the write stop flag A (see FIG. 10) output from the timing controller 90. The address generator A generates and outputs the address if the write stop flag A is 0, and stops generating and outputting the address if the write stop flag A is 1.

The image data of the object output from the rendering process executor A is stored at the address in the memory 20 if the address is output from the address generator A. If the address generator A stops outputting the address, the storage of the image data on the memory 20 is suspended.

The rendering output unit B is identical in structure and process to the rendering output unit A. The rendering output unit B also includes rendering process executor B, output buffer B, and address generator B.

The rendering process executor B generates image data of an object in response to a rendering command (see FIG. 6) of the object obtained from the parallel rendering controller 60. The image data of the object generated by the rendering process executor B (such as the bitmap data) is output to the data bus 200 via the output buffer B. The memory controller 30 then stores the image data of the object acquired via the data bus 200 onto the memory 20.

The address generator B generates an address where the object is to be stored (rendered) on the memory 20, in accordance with the address information of the object retrieved from the address register (see FIG. 7) of the unit A in the address updater 70. As to multiple lines forming the image data of each object, the address generator B generates addresses of from a start line to an end line (Y coordinates of from the start line to the end line), and addresses of from a start pixel to an end pixel on each line (X coordinates of from the start pixel to the end pixel).

The address generator B controls the timing of outputting the address in response to the write stop flag B (see FIG. 10) output from the timing controller 90. The address generator B generates and outputs the address if the write stop flag A is 0, and suspends generating and outputting the address if the write stop flag A is 1. The image data of the object output from the rendering process executor B is stored at the address in the memory 20 if the address is output from the address generator B. If the address generator B stops outputting the address, the storage of the image data on the memory 20 is suspended.

The rendering of the image data by the rendering process executor A (storage of the image data on the memory 20) and the rendering of the image data by the rendering process executor B (storage of the image data on the memory 20) may be performed in a parallel process. In the parallel process, the address generators of the rendering process executor A and the rendering process executor B operate in response to the write stop flags A and B output from the timing controller 90, thereby controlling the rendering timing (the storage timing of the memory 20).

FIG. 11 is a flowchart of the process of each of the address generators A and B. Each of the address generator A and the address generator B (FIG. 1) operates in accordance with the flowchart of FIG. 11. A write complete flag is set to 1 (S1101). The parallel rendering controller 60 sets the address information of one object to the register (see FIG. 7) of the address generator A or the address generator B whichever has a write complete flag set to 1 (S1102). In the discussion that follows, the address information is set on the address generator A.

If the setting of the address information of the object on the register of the address generator A is complete (S1103), the address generator A resets the write complete flag to 0 (S1104).

The address generator A determines whether the write stop flag A output from the timing controller 90 is 1 (S1105). If the write stop flag A is 1, the two objects being processed in the parallel process by the rendering output unit A and the rendering output unit B overlap each other, and the object of the rendering output unit A is at an upside (at an upper layer) (see FIGS. 9A-9D and 10). The address generator A stops generating and outputting the address, and the rendering of the object of the rendering output unit A (storage onto the memory 20) is temporarily suspended.

If the write stop flag A is 0, the address generator A generates and outputs the address in response to the set address information (S1106). During a period of time in which the rendering of the object by the rendering output unit A is suspended with the write stop flag A being 1 in S1105, the rendering of the object by the rendering output unit B (storage onto the memory 20) in the overlap area may continue and then may be complete. The write stop flag A is then reset to 0 (see FIG. 10), and the address generator A starts generating and outputting the address in S1106.

If the two objects being processed in the parallel process by the rendering output unit A and the rendering output unit B do not overlap each other, the write stop flag A is 0 (see FIG. 10). Without being stopped in S1105, processing proceeds to S1106 where the address generator A starts generating and outputting the address.

The address generation and outputting of one object reach an end address (S1107), and the rendering of the object is complete. The address generator A sets the write complete flag to 1 (S1108). The process is performed on the next object with S1102 and subsequent operations repeated.

The address generator B also operates in accordance with the flowchart of FIG. 11. If the write complete flag of the address generator B is set to 1 (S1101), the parallel rendering controller 60 sets the address information of one object on the register (see FIG. 7) of the address generator B (S1102). If the setting of the address information of the object is complete (S1103), the address generator B resets the write complete flag to 0 (S1104).

The address generator B determines whether the write stop flag B output from the timing controller 90 is 1 (S1105). If the write stop flag B is 1, the generation and the outputting of the address are suspended. The two objects being processed in the parallel process by the rendering output unit A and the rendering output unit B overlap each other, and the object of the rendering output unit B is at an upside (at the upper layer) (see FIGS. 9A-9D and 10). The address generator B stops generating and outputting the address, and the rendering of the object of the rendering output unit B (storage onto the memory 20) is temporarily suspended. If the write stop flag B is 0, the address generator B generates and outputs the address in response to the set address information (S1106).

The address generation and outputting of one object reach an end address (S1107), and the rendering of the object is complete. The address generator B sets the write complete flag to 1 (S1108). The process is performed on the next object with S1102 and subsequent operations repeated.

The parallel rendering controller 60 thus successively sets the address information of each object on the address generator A and the address generator B, each with the write complete flag set to 1. The rendering output unit A and the rendering output unit B execute the rendering in the parallel process, and thus render all the objects on each page. In the parallel process, the rendering timing is appropriately controlled by the write stop flags A and B output from the timing controller 90. For example, the overlap case of FIG. 2A is performed. The multiple objects are overlapped in an appropriate order while the multiple objects are rendered on each page in the parallel process.

The image processing apparatus of FIG. 1 may be modified in the sense that the overlap determiner 80 includes a parallel process end address determiner and that the timing controller 90 includes a parallel process permitter. Such a modification of the image processing apparatus performs an overlap process illustrated in FIG. 2B. The modification is described in detail below.

The modification remains unchanged from the image processing apparatus of FIG. 1 in structure and process except for those of the overlap determiner 80 and the timing controller 90. More specifically, the intermediate language data illustrated in FIGS. 3A and 3B are generated by the language data processor 10, and the process illustrated in detail with reference to FIGS. 4 through 7 is performed by the command interpreter 40, the rendering information input-output unit 50, the parallel rendering controller 60, and the address updater 70.

Figure 12:
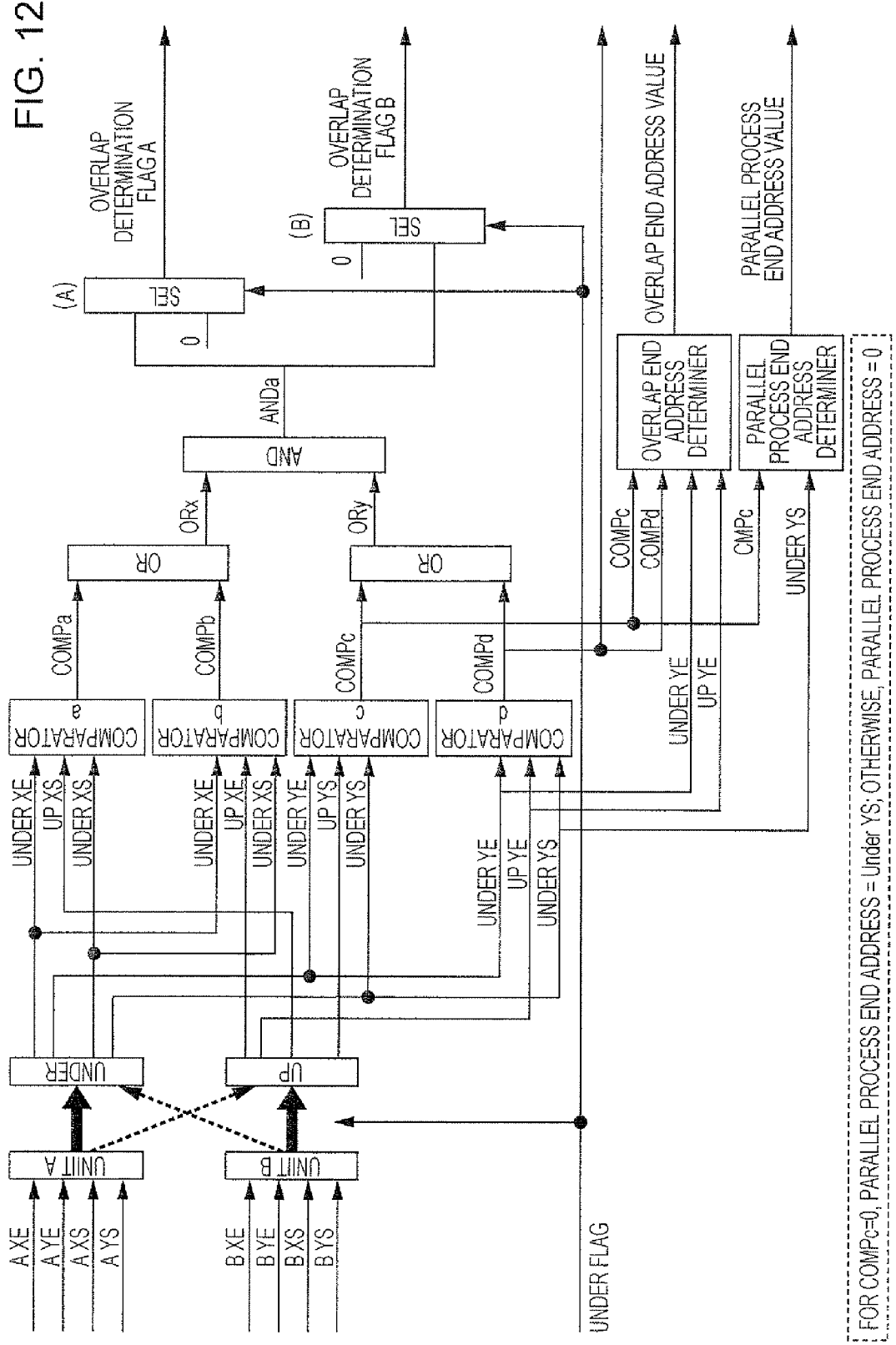
FIG. 12 illustrates a structure and process of a modification of the overlap determiner.

FIG. 12 illustrates a structure and process of the overlap determiner 80 in the modification. The modification of FIG. 12 includes the overlap determiner 80 of FIG. 8 and the parallel process end address determiner added thereto. The modification of FIG. 12 remains unchanged from the overlap determiner 80 of FIG. 8 in structure and process except for those of the parallel process end address determiner.

In the modification of FIG. 12, the overlap determiner 80 determines, in response to the under flag output by the address updater 70, which of the objects of the rendering output unit A and the rendering output unit B is at an underside. The comparator circuits a through d compare the under address information with up address information, and output the overlap determination flags A and B. The overlap end address determiner outputs the overlap end address.

The parallel process end address determiner added in the modification of FIG. 12 outputs a parallel process end address value in response to COMPc output from the comparator circuit c, and UnderYS of the under address information. The parallel process end address determiner sets the parallel process end address to UnderYS if COMPc=0, and resets the parallel process end address to 0 if otherwise.

The parallel process end address determiner is discussed in each of the four overlap cases of FIGS. 9A through 9D. Since COMPc=1 (≠0) in the overlap case of FIG. 9A, the parallel process end address is 0. The same is true of the overlap case of FIG. 9D. More specifically, the parallel process end address is 0 because COMPc=1.

In contrast, COMPc=0 in the overlap case of FIG. 9B, and the parallel process end address is UnderYS. The same is true of the overlap case of FIG. 9C. More specifically, the parallel process end address is UnderYS because COMPc=0.

Figure 13:
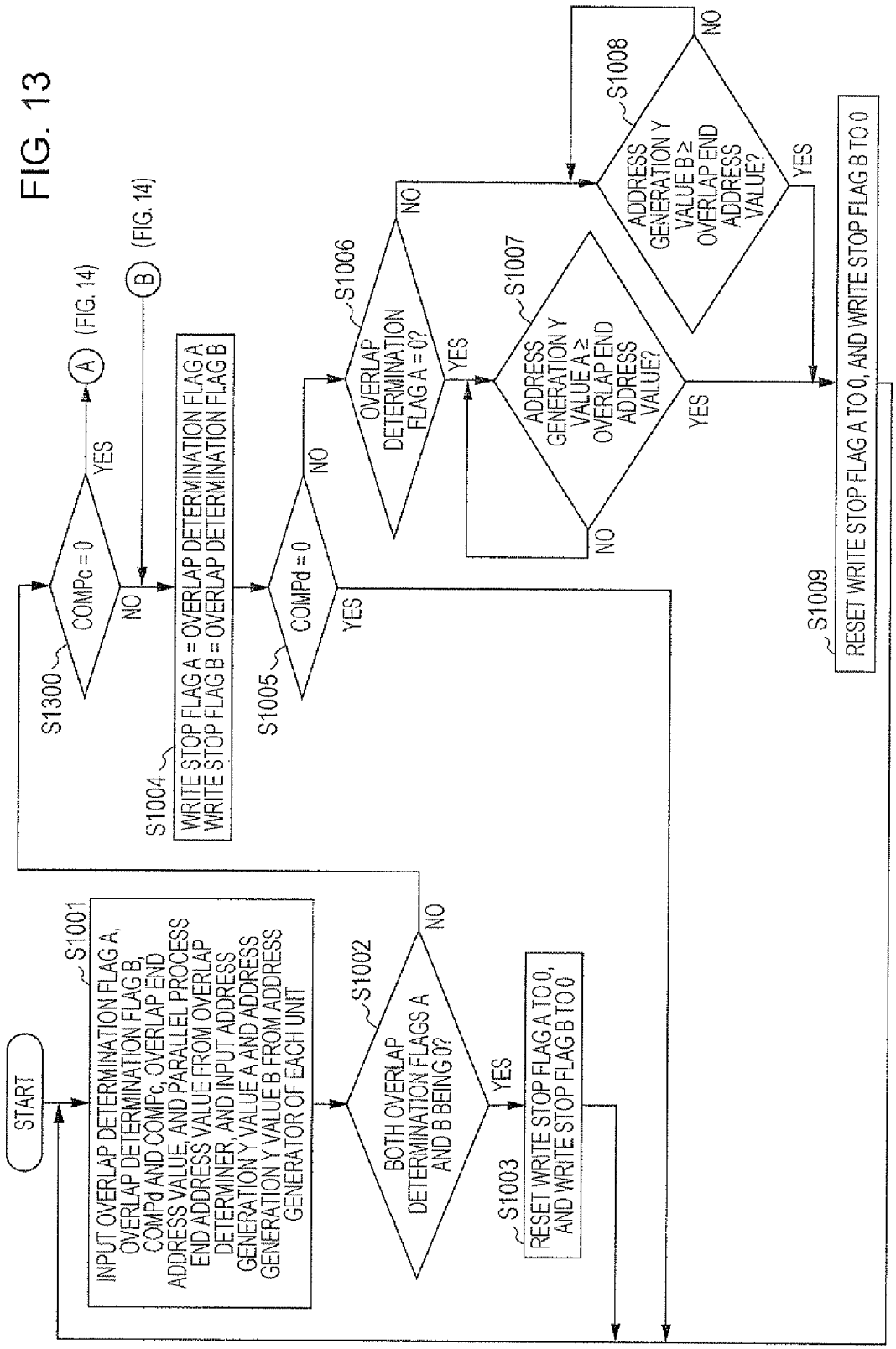
FIG. 13 is a flowchart of a process of a modification of the timing controller.

FIG. 13 is a flowchart of the process of the timing controller 90 of the modification. As illustrated in FIG. 13, S1300 is added to the flowchart of the process of the timing controller 90 of FIG. 10. COMPc and a parallel process end address value are added as input values in S1001. The flowchart of FIG. 10 is identical to the flowchart of FIG. 13 except for S1300 and the input values.

In the flowchart of the modification illustrated in FIG. 13, the timing controller 90 also receives from the overlap determiner 80 of the modification (FIG. 12) the overlap determination flag A, the overlap determination flag B, COMPd, and the overlap end address value, and receives the address generation Y value A from the address generator A of the rendering output unit A and the address generation value Y value B from the address generator B of the rendering output unit B (S1001). Further in the modification of FIG. 13, the timing controller 90 receives from the overlap determiner 80 COMPc and the parallel process end address value.

In the modification, the timing controller 90 determines the overlap determination flag A and the overlap determination flag B (S1002). If the overlap determination flag A and the overlap determination flag B are both 0, the write stop flag A is reset to 0, and the write stop flag B is also reset to 0 (S1003). If one of the overlap determination flag A and the overlap determination flag B is not 0 in the determination of the overlap determination flag A and the overlap determination flag B (S1002), the determination operation (S1300) is performed in response to COMPc in the modification of FIG. 13.

If the relationship COMPc=1 (≠0) holds in the determination operation (S1300) in response to COMPc, processing proceeds to S1004, followed by the same process as in the flowchart of FIG. 10. The overlap case described here applies to the overlap cases of FIGS. 9A and 9D.

Figure 14:
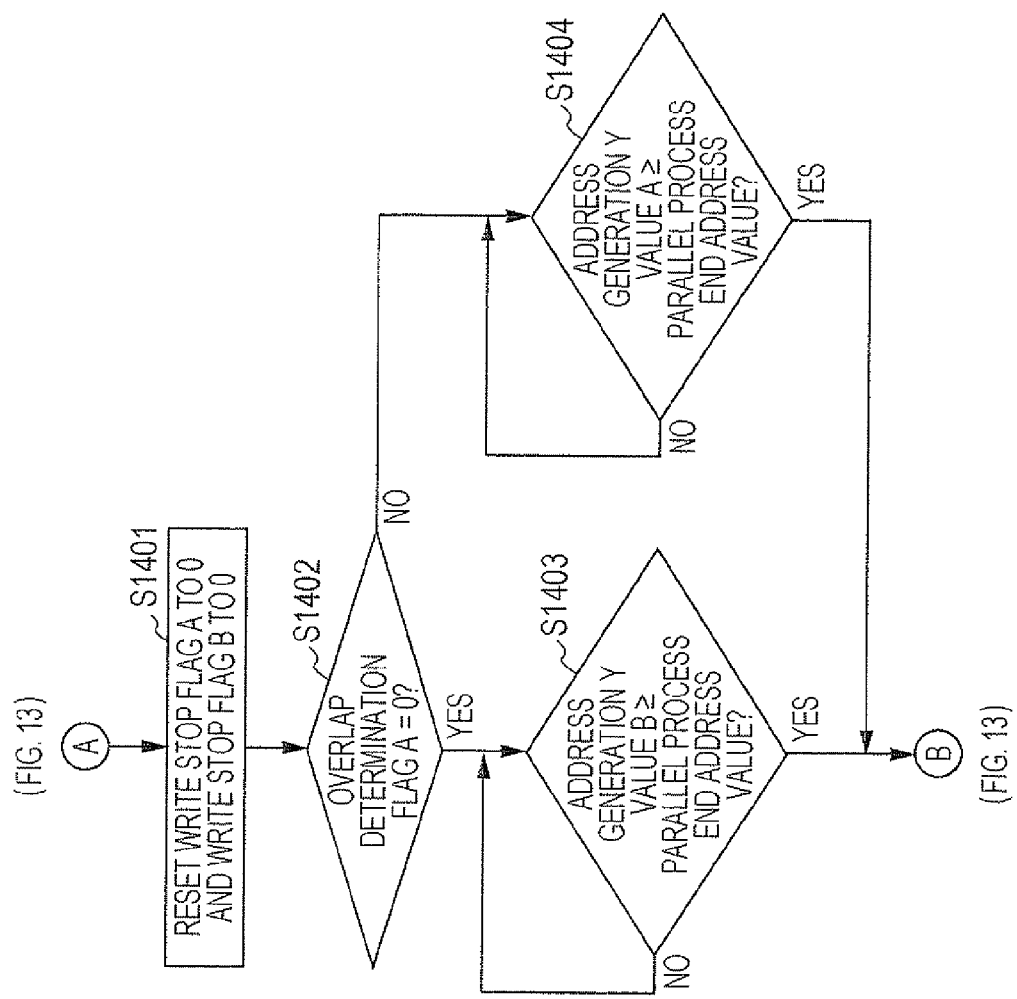
FIG. 14 is a flowchart of a process of a parallel process permitter.

If the relationship COMPc=0 holds in the determination operation (S1300) in response to COMPc in FIG. 13, a process of a flowchart of FIG. 14 is performed. The overlap case described here is applied to the overlap cases of FIG. 9B and FIG. 9C.

FIG. 14 is a flowchart of the process of the parallel process permitter. The timing controller 90 of the modification includes the parallel process permitter. The parallel process permitter performs the process of FIG. 14.

If COMPc=0 (in S1300 of FIG. 13), the parallel process permitter resets the write stop flag A to 0, and the write stop flag B to 0 (S1401). The parallel process permitter thus permits the rendering output unit A to render an object and the rendering output unit B to render an object.

The parallel process permitter determines the overlap determination flag A (S1402). If the overlap determination flag A=0, the object of the rendering output unit A is at an underside, and the object of the rendering output unit B is at an upside. The address generation Y value B is compared with the parallel process end address value on the rendering output unit B of the upside (S1403). The object rendering by the rendering output unit B is in progress. If the address generation Y value B becomes equal to or above the parallel process end address value, processing returns to the flowchart of FIG. 13 to proceed to S1004 and subsequent operations.

If the overlap determination flag A is not 0 in the determination of the overlap determination flag A of FIG. 14 (S1402), the object of the rendering output unit A is at an upside, and the object of the rendering output unit B is at an underside. The address generation Y value A is compared with the parallel process end address value on the rendering output unit A of the upside (S1404). The object rendering by the rendering output unit A is in progress. If the address generation Y value A becomes equal to or above the parallel process end address value, processing returns to the flowchart of FIG. 13 to proceed to S1004 and subsequent operations.

If the write stop flag A=the overlap determination flag A and the write stop flag B=the overlap determination flag B in S1004 of FIG. 13, the write stop flag of the upside object is set to 1 and the write stop flag of the underside object is reset to 0. In other words, the state in S1401 of FIG. 14 where both the object rendering by the rendering output unit A and the object rendering by the rendering output unit B are permitted is shifted to the state in S1004 of FIG. 13 where the rendering of the upside object is suspended. S1004 and subsequent operations of FIG. 13 to be performed are identical to those in the flowchart of FIG. 10.

If COMPc=0 in S1300 of FIG. 13, the parallel process permitter of FIG. 14 permits both the upside object 2 and the underside object 1 to be rendered in each of the overlap cases of FIG. 9B and FIG. 9C. The object is rendered (written on the memory 20) in the order of small to large address generation Y value. If the address generation Y value of the upside object 2 becomes equal to or above the parallel process end address value, the rendering of the upside object 2 is suspended in S1004 of FIG. 13.

Each of the overlap cases of FIG. 9B and FIG. 9C, the rendering of the underside object 1 and the upside object 2 starts with UpYS. When the rendering of the upside object 2 reaches UnderYS, the rendering of the upside object 2 is suspended. The rendering of the underside object 1 is continuously performed. If the rendering of the underside object 1 reaches the overlap end address value, the rendering of the upside object 2 resumes at UnderYS.

The modification described above performs the overlap case of FIG. 2B. Multiple objects are overlapped in an appropriate order while the multiple objects are rendered in the parallel process. The modification achieves a more efficient overlap process than when the rendering of the upper-layer object is suspended prior to the overlap starting address.

The image processing apparatus of the exemplary embodiment has been discussed. The function of the image processing apparatus of FIG. 1 and the function of the modification discussed with reference to FIGS. 12 through 14 may be at least partly implemented using a computer. For example, a program may be used to cause the computer to implement part of the function of each of the command interpreter 40, the rendering information input-output unit 50, the parallel rendering controller 60, the address updater 70, the overlap determiner 80, the timing controller 90, and the rendering output unit A and the rendering output unit B. The program may be supplied to the computer on a computer readable medium or via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a rendering processor that concurrently renders a plurality of objects on a page in a parallel process;
    an overlap determiner that determines a plurality of objects overlapping each other in accordance with coordinate information of each object on the page and acquires coordinate information defining an entire overlap area of the objects, the overlap area of the objects defining an area where the plurality of objects overlap with each other;
    a timing controller that controls a timing of the rendering of each object in the parallel process of the rendering processor in accordance with the coordinate information of the overlap area; and
    a renderer that renders a lower-layer object in the overlap area in accordance with timing information generated by the timing controller prior to rendering an upper-layer object on the lower-layer object in a superimpose fashion,
    wherein the overlap determiner determines a plurality of mutually overlapping objects by comparing the coordinate information of the plurality of objects and identifies an end coordinate of the overlap area in the rendering,
    wherein the timing controller controls the timing of the rendering of the upper-layer object in response to the end coordinate,
    wherein the overlap determiner identifies a start coordinate of the rendering in addition to the end coordinate of the rendering in the overlap area by comparing the coordinate information of the plurality of objects, wherein the timing controller controls the timing of the rendering of the upper-layer object in accordance with the end coordinate and the start coordinate, and wherein the timing controller causes the upper-layer object to be rendered while causing the lower-layer object to be rendered before the rendering of the upper-layer object reaches the start coordinate, causes the lower-layer object to be continuously rendered with the rendering of the upper-layer object suspended after the rendering of the upper-layer object reaches the start coordinate, and causes the rendering of the upper-layer object to resume at the start coordinate when the rendering of the lower-layer object reaches the end coordinate.

2. The image processing apparatus according to claim 1, wherein the timing controller suspends the rendering of the upper-layer object in the overlap area until the rendering of the lower-layer object reaches the end coordinate.

3. The image processing apparatus according to claim 2, wherein the overlap determiner identifies a start coordinate of the rendering in addition to the end coordinate of the rendering in the overlap area by comparing the coordinate information of the plurality of objects, and wherein the timing controller controls the timing of the rendering of the upper-layer object in accordance with the end coordinate and the start coordinate.

4. The image processing apparatus according to claim 3, wherein the timing controller causes the upper-layer object to be rendered while causing the lower-layer object to be rendered before the rendering of the upper-layer object reaches the start coordinate, causes the lower-layer object to be continuously rendered with the rendering of the upper-layer object suspended after the rendering of the upper-layer object reaches the start coordinate, and causes the rendering of the upper-layer object to resume at the start coordinate when the rendering of the lower-layer object reaches the end coordinate.

5. An information processing method, comprising:
concurrently rendering a plurality of objects on a page in a parallel process;
determining a plurality of objects overlapping each other in accordance with coordinate information of each object on the page and acquiring coordinate information defining an entire overlap area of the objects, the overlap area of the objects defining an area where the plurality of objects overlap with each other;
controlling a timing of the rendering of each object in the parallel process in accordance with the coordinate information of the overlap area; and
rendering a lower-layer object in the overlap area in accordance with generated timing information prior to rendering an upper-layer object on the lower-layer object in a superimpose fashion,
wherein determining a plurality of objects overlapping each other comprises comparing the coordinate information of the plurality of objects and identifying an end coordinate of the overlap area in the rendering,
further comprising:
controlling the timing of the rendering of the upper-layer object in response to the end coordinate,
identifying a start coordinate of the rendering in addition to the end coordinate of the rendering in the overlap area by comparing the coordinate information of the plurality of objects,
controlling the timing of the rendering of the upper-layer object in accordance with the end coordinate and the start coordinate, and
causing the upper-layer object to be rendered while causing the lower-layer object to be rendered before the rendering of the upper-layer object reaches the start coordinate, causing the lower-layer object to be continuously rendered with the rendering of the upper-layer object suspended after the rendering of the upper-layer object reaches the start coordinate, and causing the rendering of the upper-layer object to resume at the start coordinate when the rendering of the lower-layer object reaches the end coordinate.

6. A non-transitory computer readable medium storing a program causing a computer to execute a process for concurrently rendering a plurality of objects on a page in a parallel process, the process comprising:
determining a plurality of objects overlapping each other in accordance with coordinate information of each object on the page and acquiring coordinate information defining an entire overlap area of the objects, the overlap area of the objects defining an area where the plurality of objects overlap with each other; and
rendering a lower-layer object in the overlap area prior to rendering an upper-layer object on the lower-layer object in a superimpose fashion by controlling a timing of the rendering of each object in the parallel process in accordance with the coordinate information of the overlap area,
wherein determining a plurality of objects overlapping each other comprises comparing the coordinate information of the plurality of objects and identifying an end coordinate of the overlap area in the rendering,
further comprising:
controlling the timing of the rendering of the upper-layer object in response to the end coordinate,
identifying a start coordinate or the rendering in addition to the end coordinate of the rendering in the overlap area by comparing the coordinate information of the plurality of objects,
controlling the timing of the rendering of the upper-layer object in accordance with the end coordinate and the start coordinate, and
causing the upper-layer object to be rendered while causing the lower-layer object to be rendered before the rendering of the upper-layer object reaches the start coordinate, causing the lower-layer object to be continuously rendered with the rendering of the upper-layer object suspended after the rendering of the upper-layer object reaches the start coordinate, and causing the rendering of the upper-layer object to resume at the start coordinate when the rendering, of the lower-layer object reaches the end coordinate.

* * * * *